United States Patent
Funaki et al.

(10) Patent No.: US 6,528,600 B2
(45) Date of Patent: Mar. 4, 2003

(54) METHOD FOR PRODUCING A TETRAFLUOROETHYLENE/PERFLUORO (ALKYL VINYL ETHER) TYPE COPOLYMER

(75) Inventors: Atsushi Funaki, Chiba (JP); Naoko Sumi, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/910,831

(22) Filed: Jul. 24, 2001

(65) Prior Publication Data

US 2002/0016428 A1 Feb. 7, 2002

(30) Foreign Application Priority Data

Jul. 31, 2000 (JP) ......................................... 2000-231911
May 16, 2001 (JP) ......................................... 2001-146903

(51) Int. Cl.$^7$ ........................... C08F 2/42; C08F 214/26; C08F 214/18
(52) U.S. Cl. ........................... 526/206; 526/82; 526/231; 526/247; 526/250
(58) Field of Search ............................... 526/247, 250, 526/206, 231, 82

(56) References Cited

U.S. PATENT DOCUMENTS 3,642,742 A * 2/1972 Carlson

FOREIGN PATENT DOCUMENTS

EP 0 648 787 4/1995
EP 0 723 979 7/1996

* cited by examiner

Primary Examiner—Fred Zitomer
(74) Attorney, Agent, or Firm—Oblon, Spivak, McClelland, Maier & Neustadt, P.C.

(57) ABSTRACT

A method for producing a tetrafluoroethylene/perfluoro (alkyl vinyl ether) type copolymer (PFA), which comprises carrying out the polymerization in a polymerization medium (such as $CHFClCF_2CF_2Cl$) in the presence of a chain transfer agent of a $C_{1 \text{ or } 2}$ hydrofluorocarbon (such as $CH_3CF_2H$) by means of a polymerization initiator (such as $(FCF_2CF_2CF_2COO)_2$). PFA obtained by this method has a small amount of unstable terminal groups contained in its molecule and is excellent in thermal stability and cracking resistance against a liquid reagent. Further, the amount of elution of fluorine ions is little even when it is applied to a component of e.g. an equipment for the production of semiconductors.

18 Claims, No Drawings

METHOD FOR PRODUCING A TETRAFLUOROETHYLENE/PERFLUORO (ALKYL VINYL ETHER) TYPE COPOLYMER

The present invention relates to a method for producing a tetrafluoroethylene/perfluoro(alkyl vinyl ether) type copolymer excellent in stability.

A tetrafluoroethylene (hereinafter referred to as TFE)/perfluoro(alkyl vinyl ether) (hereinafter referred to as PAVE) type copolymer (hereinafter referred to as PFA) is known as a melt processable fluororesin and is widely used as a material for formed products such as tubes, pipes, joints and containers, for wire coatings, for coating, for lining, etc.

When PFA is used for containers, pipings or joints for a liquid reagent for semiconductors, there has been a problem that fluorine ions tend to elute from PFA, and cracking is likely to form by the liquid reagent. In such an application, it is common to use PFA stabilized by treatment with fluorine gas (hereinafter referred to as fluorination) to convert unstable terminal groups in the molecule to stable terminal groups in order to reduce elution of fluorine ions or to improve the cracking resistance against a liquid reagent. PFA stabilized by fluorination is free from a problem such that the unstable terminal groups are decomposed during injection molding to form hydrofluoric acid which in turn corrodes a mold and has merits for molding, as compared with conventional PFA having unstable terminal groups.

However, for the production of PFA stabilized by fluorination, a treatment installation employing a fluorine gas is required, and there has been a problem that the production process tends to be cumbersome.

As the terminal groups in PFA, the following terminal groups are conceivable.

When PFA is produced by solution polymerization or suspension polymerization, terminal groups derived from a polymerization initiator tend to be substantial. In the production of PFA, as the polymerization initiator, a fluorine type polymerization initiator of e.g. $(X(CF_2)_nCOO)_2$ (wherein X is a hydrogen atom, a fluorine atom or a chlorine atom, and n is an integer of from 1 to 10) is preferred. As a result, the terminal groups derived from the polymerization initiator will be stable terminal groups such as $X(CF_2)_n$ groups.

On the other hand, the following three types are conceivable as unstable terminal groups in PFA which cause elution of fluorine ions or cracking by a liquid reagent.

(1) Terminal groups derived from a chain transfer agent.
(2) —COF terminal groups formed by a transition reaction of radicals formed when PAVE is added to growing chain radicals in the copolymerization process of TFE and PAVE as shown by the formula 1 and disclosed in JP-B-4-83:

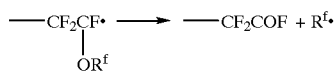

Formula 1 wherein $R^f$ is a perfluoroalkyl group.

(3) —COOH terminal groups formed by hydrolysis of —COF groups.

Among them, the number of unstable terminal groups derived from a chain transfer agent is large. Such terminal groups derived from a chain transfer agent are different depending upon the type of the chain transfer agent to be employed.

U.S. Pat. No. 3,642,742 discloses a case where cyclohexane and methanol are used as chain transfer agents. With cyclohexane, cyclohexyl groups will be formed as terminal groups, and with methanol, —CH$_2$OH groups are formed. When either one of the chain transfer agents was used, the thermal stability of the formed PFA was low.

When methane is used as a chain transfer agent, —CH$_3$ groups will be formed as terminal groups. As compared with —CH$_2$OH groups, —COF groups and —COOH groups, the stability of PFA will be improved with —CH$_3$ groups. However, even then, the stability is not sufficient for an application to semiconductors, and it has been necessary to change —CH$_3$ groups to —CF$_3$ groups by fluorination for the purpose of stabilization.

Accordingly, it has been desired to develop a method for producing stable PFA, which does not require a treatment process employing a fluorine gas.

It is an object of the present invention to provide a method for producing PFA having a small content of unstable terminal groups contained in the molecule.

The present invention provides a method for producing PFA which comprises carrying out polymerization in a polymerization medium in the presence of a chain transfer agent by means of a polymerization initiator, wherein the chain transfer agent is a $C_{1\,or\,2}$ hydrofluorocarbon.

In the method for producing PFA according to the present invention, as the polymerization method, a known polymerization method such as suspension polymerization, solution polymerization, emulsion polymerization or bulk polymerization may be employed without any particular limitation. Particularly preferred is solution polymerization or suspension polymerization.

In the method for producing PFA according to the present invention, TFE and PAVE which are monomers, are co-polymerized.

As PAVE, a monomer represented by $CF_2=CFOR^f$ is employed. $R^f$ is a perfluoroalkyl group, preferably a $C_{1-6}$ linear, branched or cyclic perfluoroalkyl group, more preferably a linear perfluoroalkyl group, still further preferably, a perfluoromethyl group, a perfluoroethyl group or a perfluoro n-propyl group.

In the present invention, in addition to TFE and PAVE, other monomers may be copolymerized in a small amount. As such other monomers, fluorine-containing olefins other than TFE, such as trichlorofluoroethylene and hexafluoropropylene, may be mentioned.

In the present invention, the ratio of polymerized units of TFE to polymerized units of PAVE in PFA is preferably such that polymerized units of TFE/polymerized units of PAVE are equal to from 99.5/0.5 to 95/5 (molar ratio). If the ratio is smaller than this range, the processability and stress cracking resistance tend to deteriorate, and if it is larger than this range, the mechanical properties tend to deteriorate. More preferably, polymerized units of TFE/polymerized units of PAVE are equal to from 99/1 to 97/3 (molar ratio).

The content of polymerized units of other monomers is preferably from 0 to 10 mol %, more preferably from 1 to 8 mol %, based on the total mol amount of polymerized units of TFE and polymerized units of PAVE.

As the polymerization medium in the present invention, a fluorine-containing organic medium having a small chain transfer coefficient is preferred. Particularly preferred is at least one polymerization medium selected from the group consisting of a $C_{3-10}$ perfluorocarbon, a $C_{3-10}$ hydrofluorocarbon and a $C_{3-10}$ hydrochlorofluorocarbon.

The perfluorocarbon is preferably a saturated perfluorocarbon having a linear, branched or cyclic structure (provided that it may contain an etheric oxygen atom in its molecule). Specific examples include perfluorocyclobutane, perfluorohexane, perfluoro(dipropyl ether), perfluorocyclohexane and perfluoro(2-butyltetrahydrofuran).

The hydrofluorocarbon is preferably a saturated hydrofluorocarbon having a linear, branched or cyclic structure, wherein the number of fluorine atoms in the molecule is larger than the number of hydrogen atoms (provided that it may contain an etheric oxygen atom in the molecule). Specific examples include $CH_3OC_2F_5$, $CH_3OC_3F_7$, $C_5F_{10}H_2$, $C_6F_{13}H$ and $C_6F_{12}H_2$.

The hydrochlorofluorocarbon is preferably a hydrochlorofluorocarbon having a linear, branched or cyclic structure, wherein the number of hydrogen atoms is at most 3 (provided that it may contain an etheric oxygen atom in the molecule). Specific examples include $CHClFCF_2CF_2Cl$.

The amount of the polymerization medium to be used is preferably from 10 to 90%, more preferably from 30 to 70%, by volume %, based on the volume of the autoclave.

As the chain transfer agent in the present invention, a $C_1$ or 2 hydrofluorocarbon is used. Further, a hydrofluorocarbon wherein the molar ratio of number of hydrogen atoms/number of fluorine atoms in its molecule is from 1/2 to 5/1, is preferred. Specific examples include $CF_2H_2$, $CFH_3$, $CFH_2CH_3$, $CF_2HCH_3$, $CFH_2CFH_2$, $CF_2HCFH_2$, $CF_3CH_3$ and $CF_3CFH_2$. Further, from the viewpoint of the chain transfer property, a hydrofluorocarbon having a larger number of hydrogen atoms than the number of fluorine atoms in its molecule, is preferred. By the use of such a chain transfer agent, PFA excellent in stability will be formed.

The amount of the chain transfer agent is preferably from 0.1 to 50 mass %, more preferably from 1 to 40 mass %, based on the amount o the polymerization medium.

As the polymerization initiator in the present invention, a fluorocarbon type diacyl peroxide is preferred since it forms PFA having stable terminal groups. Particularly preferred is a diacyl peroxide represented by $(X(CF_2)_nCOO)_2$ (wherein X is a hydrogen atom, a fluorine atom or a chlorine atom, and n is an integer of from 1 to 10). By the use of such a polymerization initiator, PFA excellent in the stability will be formed.

Specific examples of such a diacyl peroxide include $(CF_3COO)_2$, $(CF_3CF_2COO)_2$, $(CF_3CF_2CF_2COO)_2$, $(HCF_2CF_2COO)_2$, $(HCF_2CF_2CF_2COO)_2$, $(ClCF_2CF_2COO)_2$ and $(ClCF_2CF_2CF_2COO)_2$.

The amount of the polymerization initiator is preferably from 0.01 to 1%, more preferably from 0.01 to 0.5%, by mass %, based on TFE to be post charged.

The polymerization temperature in the present invention is preferably from 20 to 75° C. If the temperature is higher than this range, the number of —COF terminal groups to be formed, tends to increase, and if it is lower than this range, the decomposition speed of the initiator tends to be slow. More preferably, it is from 30 to 60° C.

The polymerization pressure in the present invention is preferably from 0.7 to 10 MPa. If the polymerization pressure is too low, the content of —COF terminal groups in PFA increases, and if the polymerization pressure is too high, such is not desirable for the production equipment. It is more preferably from 0.8 to 5 MPa and most preferably from 1 to 3 MPa.

PFA to be produced by the method of the present invention preferably has an apparent melt viscosity of from $1\times10^2$ to $1\times10^5$ Pa·s at 380° C. If the apparent melt viscosity is too low, the processability tends to be low, thus leading to surface roughening, and if the apparent melt viscosity is too high, the mechanical properties and heat resistance tend to deteriorate. More preferably, it is from $1\times10^3$ to $5\times10^4$ Pa·s.

PFA produced by the method of the present invention, may be processed by a method such as injection molding, extrusion, transfer molding, rotational molding or electrostatic powder coating.

PFA produced by the method of the present invention is excellent in the applicability to tubes, hoses, containers, joints, etc., to be used particularly in connection with the equipment for the production of semiconductors. Further, other than in connection with the equipments for the production of semiconductors, it is excellent also in the applicability to components, pipings or tank linings of chemical plant installations, or to injection molded components, copy rolls, etc. of e.g. office automation equipments.

Now, the present invention will be described in further detail with reference to Examples. However, the present invention is not limited thereto. Examples 1, 2 and 3 are Examples of the present invention, and Example 4 is a Comparative Example.

The method for measuring the number of unstable terminal groups of PFA, the method for measuring the content of polymerized units of perfluoro(n-propyl vinyl ether) (hereinafter referred to as PPVE) in PFA, and the method for measuring the apparent melt viscosity and the amount of eluted fluorine ions, were as follows.

Number of Unstable Terminal Groups in PFA

Calculated in accordance with the disclosure in JP-B-7-30134 from p.11 l.43 to p.13 l.37, except that a Fourier transform infrared spectrophotometer was used as an instrument for analysis.

Content of Polymerized Units of PPVE in PFA

Calculated in accordance with the disclosure in JP-B-7-30134 from p.13 l.47 to p.14 l.24, from the ratio of the absorbance at 10.07 μm to the absorbance at 4.25 μm, by the infrared spectroscopic analysis.

Apparent Melt Viscosity (Pa·s)

Using a flow tester (manufactured by Shimadzu Corporation), the extrusion rate ($cm^3/s$) of PFA extruded into an orifice having a diameter of 2.1 mm and a length of 8 mm under a load of 7 kg at 380° C., was measured, and it was calculated as a value obtained by dividing 40.93 by the measured value.

Amount of Eluted Fluorine Ions 10 g of a pelletized sample was put into 20 ml of a liquid of water/methanol/total ion strength-adjusting agent (CHISABU 11, manufactured by Toa Denpa K.K.)=1/1/2 (mass ratio) and left to stand at room temperature for 24 hours, whereupon the fluorine ion concentration was measured and obtained by an ion meter (IM-40S, manufactured by Toa Denpa K.K.).

Amount of Heat-generated Fluorine Ions 0.35 g of a sample was put into an IR image furnace, heated from room temperature to 390° C. in 2 minutes while supplying 150 ml/min of air as a carrier gas and maintained at 390° C. for 20 minutes, whereby the generated gas was trapped in 1,000 ml of a 0.1 mol/l NaOH aqueous solution, and the amount of fluorine ions was measured by a fluorine ion electrode. The unit is the amount (mg) of fluorine ions per g of PFA.

EXAMPLE 1

Into a 1 l autoclave equipped with a stirrer, 437 g of deionized water, 272 g of $CHFClCF_2CF_2Cl$, 20 g of PPVE and 75 g of $CH_3CF_2H$ were charged, and at an internal temperature of 50° C., TFE was charged until the pressure became 1.35 MPa. Then, 1 ml of a solution containing 1 mass % of $(FCF_2CF_2CF_2COO)_2$ (solvent: $CHFClCF_2CF_2Cl$) was charged as an initiator solution, to initiate the polymerization. During the polymerization, the initiator solution was intermittently charged in a total amount of 13 ml. As the polymerization proceeded, the pressure decreased. Accordingly, in order to adjust the pressure to be constant, TFE was continuously post-charged. When the amount of post-charged TFE became 120 g, the internal temperature was cooled to room temperature, and non-reacted TFE was released, and the autoclave was opened.

The content of the autoclave was filtered by a glass filter to obtain PFA in the form of a slurry. The obtained slurry was dried at 120° C. for 8 hours to obtain 119 g of white PFA. The content of polymerized units of PPVE in the obtained PFA was 1.45 mol %, and the apparent melt viscosity was 8,500 Pa·s. With this PFA, —COF groups and —COOH groups as unstable terminal groups, were not detected. The concentration of eluted fluorine ions was 0.5 ppm, and the amount of heat-generated fluorine ions was 2.2 mg/g.

EXAMPLE 2

Polymerization was carried out in the same manner as in Example 1 except that 51 g of $CH_2F_2$ was charged instead of $CH_3CF_2H$ and 17 g of PPVE was charged, to obtain 115 g of PFA. The content of polymerized units of PPVE in the obtained PFA was 1.86 mol %, and the apparent melt viscosity was 16,400 Pa·s. With this PFA, —COF groups and —COOH groups as unstable terminal groups, were not detected. The concentration of the eluted fluorine ions was 0.4 ppm, and the amount of heat-generated fluorine ions was 1.7 mg/g.

EXAMPLE 3

Polymerization was carried out in the same manner as in Example 1 except that 600 g of $CF_3CH_2F$ was charged instead of $CH_3CF_2H$, and 23 g of PPVE, 341 g of $CHClCF_2CF_2CFCl$ and 351 g of deionized water were charged, to obtain 124 g of PFA. The content of polymerized units of PPVE in the obtained PFA was 1.86 mol %, and the apparent melt viscosity was 3,790 Pa·s. With this PFA, —COF groups and —COOH groups as unstable terminal groups were not detected. The concentration of eluted fluorine ions was 0.5 ppm, and the amount of heat-generated fluorine ions was 1.6 mg/g.

EXAMPLE 4

Comparative Example

Polymerization was carried out in the same manner as in Example 1 except that 2.0 g of methane was charged instead of $CH_3CF_2H$, 5.5 g of PPVE was charged, the polymerization pressure was changed to 0.4 MPa, and the amount of post-charged TFE was 40 g, to obtain 42 g of PFA. The content of polymerized units of PPVE in the obtained PFA was 1.45 mol %, and the apparent melt viscosity was 8,500 Pa·s. With this PFA, —COF groups and —COOH groups as unstable terminal groups were not detected. The concentration of eluted fluorine ions was 1.4 ppm, and the amount of heat-generated fluorine ions was 3.3 mg/g.

As described in the foregoing, PFA produced by the method of the present invention has a small content of unstable terminal groups and thus is excellent in thermal stability and cracking resistance against a liquid reagent. Further, the concentration of eluted fluorine ions and the amount of heat-generated fluorine ions are small, and thus, it is excellent in applicability to components of e.g. equipments for the production of semiconductors.

What is claimed is:

1. A method for producing a tetrafluoroethylene/perfluoro (alkyl vinyl ether) type copolymer, which comprises carrying out the polymerization in a polymerization medium in the presence of a chain transfer agent by means of a polymerization initiator, wherein the chain transfer agent is a $C_{1 \text{ or } 2}$ hydrofluorocarbon, and wherein no —COOH groups as unstable terminal groups are detected in the copolymer.

2. The method according to claim 1, wherein the hydrofluorocarbon has a molar ratio of number of hydrogen atoms/number of fluorine atoms in its molecule being from 1/2 to 5/1.

3. The method according to claim 1, wherein the hydrofluorocarbon has a larger number of hydrogen atoms than the number of fluorine atoms in its molecule.

4. The method according to claim 1, wherein the polymerization initiator is a diacyl peroxide represented by $(X(CF_2)_nCOO)_2$, wherein X is a hydrogen atom, a fluorine atom or a chlorine atom, and n is an integer of from 1 to 10.

5. The method according to claim 1, wherein the polymerization medium is at least one member selected from the group consisting of a $C_{3-10}$ perfluorocarbon, a $C_{3-10}$ hydrofluorocarbon and a $C_{3-10}$ hydrochlorofluorocarbon.

6. The method according to claim 1, wherein the perfluoro (alkyl vinyl ether) is represented by $CF_2=CFOR^f$ (wherein $R^f$ is a $C_{1-6}$ linear perfluoroalkyl group).

7. The method according to claim 6, wherein $R^f$ is a perfluoromethyl group, a perfluoroethyl group or a perfluoro-n-propyl group.

8. The method according to claim 1, wherein the hydrofluorocarbon is selected from the group consisting of $CF_2H_2$, $CFH_3$, $CFH_2CH_3$, $CF_2HCH_3$, $CFH_2CFH_2$, $CF_2HCFH_2$, $CF_3CH_3$ and $CF_3CFH_2$.

9. A method for producing a tetrafluoroethylene/perfluoro (alkyl vinyl ether) type copolymer, which comprises carrying out the polymerization in a polymerization medium in the presence of a chain transfer agent which is a diacyl peroxide represented by $(X(CF_2)_nCOO)_2$, wherein X is a hydrogen atom, a fluorine atom or a chlorine atom, and n is an integer of from 1 to 10, by means of a polymerization initiator, wherein the chain transfer agent is a $C_{1 \text{ or } 2}$ hydrofluorocarbon.

10. The method according to claim 9, wherein the chain transfer agent is selected from the group consisting of $CF_2H_2$, $CFH_3$, $CFH_2CH_3$, $CF_2HCH_3$, $CFH_2CFH_2$, $CF_2HCFH_2$, $CF_3CH_3$ and $CF_3CFH_2$.

11. The method according to claim 9, wherein the polymerization medium is at least one member selected from the group consisting of a $C_{3-10}$ perfluorocarbon, a $C_{3-10}$ hydrofluorocarbon and a $C_{3-10}$ hydrochlorofluorocarbon.

12. The method according to claim 9, wherein the perfluoro(alkyl vinyl ether) is represented by $CF_2=CFOR^f$ (wherein $R^f$ is a $C_{1-6}$ linear perfluoroalkyl group).

13. The method according to claim 12, wherein $R^f$ is a perfluoromethyl group, a perfluoroethyl group or a perfluoro-n-propyl group.

14. A method for producing a tetrafluoroethylene/ perfluoro(alkyl vinyl ether) type copolymer, which comprises carrying out the polymerization in a polymerization medium in the presence of a chain transfer agent by means of a polymerization initiator, wherein the chain transfer agent is a $C_{1 \text{ or } 2}$ hydrofluorocarbon selected from the group consisting of $CF_2H_2$, $CFH_3$, $CFH_2CH_3$, $CFH_2CFH_2$, $CF_2HCFH_2$, and $CF_3CH_3$.

15. The method according to claim 14, wherein the polymerization initiator is a diacyl peroxide represented by $(X(CF_2)_nCOO)_2$, wherein X is a hydrogen atom, a fluorine atom or a chlorine atom, and n is an integer of from 1 to 10.

16. The method according to claim 14, wherein the polymerization medium is at least one member selected from the group consisting of a $C_{3-10}$ perfluorocarbon, a $C_{3-10}$ hydrofluorocarbon and a $C_{3-10}$ hydrochlorofluorocarbon.

17. The method according to claim 14, wherein the perfluoro(alkyl vinyl ether) is represented by $CF_2=CFOR^f$ (wherein $R^f$ is a $C_{1-6}$ linear perfluoroalkyl group).

18. The method according to claim 17, wherein $R^f$ is a perfluoromethyl group, a perfluoroethyl group or a perfluoro-n-propyl group.

* * * * *